June 25, 1940.                W. B. HENDREY                2,206,006
                           GAUGE CLEANING DEVICE
                             Filed Oct. 6, 1937

WALDERSEE B. HENDREY
INVENTOR

BY R. J. Dearborn
ATTORNEY

Patented June 25, 1940

2,206,006

UNITED STATES PATENT OFFICE 2,206,006

GAUGE CLEANING DEVICE

Waldersee B. Hendrey, Beacon, N. Y., assignor to The Texas Company, New York, N. Y., a corporation of Delaware Application October 6, 1937, Serial No. 167,535

2 Claims. (Cl. 73—324)

This invention relates to the cleaning of measuring instruments such as gauge glasses having observation windows of glass or other transparent material, and more particularly to the cleaning of the rear or inner surfaces of such observation windows. The principal object of the invention is the provision of a cleaning device which will not necessitate any outside connections or openings such as packing glands or stuffing boxes in the housing of the instrument and which for this reason will not increase the danger of leakage of any fluid which might be contained in the instrument.

There are many instances where it is desirable that the interior of a measuring device such as a gauge glass be kept clean, for example, when observing a dark colored fluid through a glass in determining the line of demarcation between the raffinate and solvent-oil and the extract and solvent-oil in solvent refining processes. Difficulty has frequently been encountered due to the deposition on the interior of the glass of the dark colored constituents of the liquid.

Other devices for cleaning gauge glasses have proved unsatisfactory for various reasons. In those cases where a scraper or brush is manipulated within the gauge by means of a rod or wire attached to the brush and passing outwardly of the gauge housing, stuffing boxes or packing glands are necessary and these increase the likelihood of leakage which would be especially dangerous when inflammable liquids under high pressures are being gauged. Those types in which a scraper or brush is moved through the interior of the glass housing by means of fluid pressure require additional valves and fittings and generally cannot be used without interfering with the operation of the system being engaged.

In accordance with this invention, a brush or scraper formed partly, at least, of iron or some other magnetic material is disposed within the gauge so that it can be moved along the inner surface of the glass observation window by means of a magnet movable manually or otherwise along the outer surface of the glass. No actuating wires or rods with attendant stuffing boxes or packing glands are necessary and the wiper can obviously be manipulated without interfering with the liquid in the glass.

Figure 1:
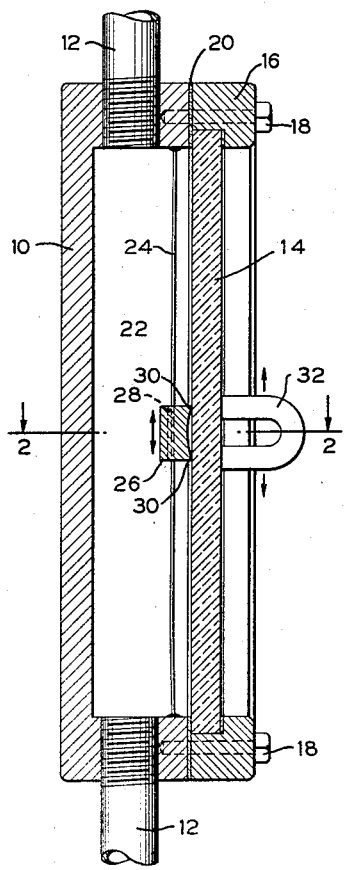
Figure 2:
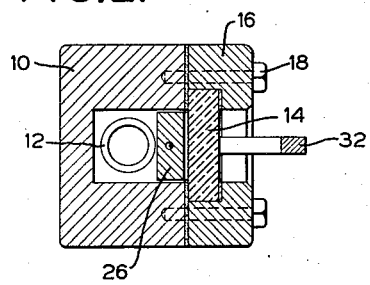
Figure 3:
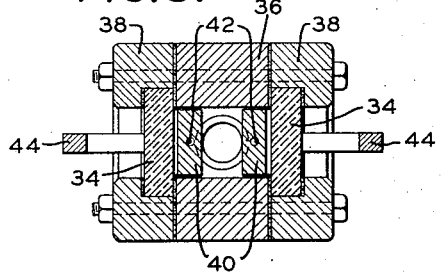

For a better understanding of the invention, reference may be had to the accompanying drawing in which Figure 1 is a sectional elevation of a gauge showing the scraper and the actuating magnet, Figure 2 is a sectional view taken on line 2—2 of Figure 1, and Figure 3 is a view similar to Figure 2 but showing a gauge having glasses at opposite sides thereof.

Referring to the drawing, a liquid level gauge of the Jerguson or flat plate type is shown in Figures 1 and 2, this gauge comprising a housing 10 to the upper and lower ends of which pipes 12 are connected, these pipes leading to the vessel containing the liquid, the level of which is to be measured. A glass plate 14 forms an observation window and closes the front face or side of the housing. The glass plate is held in place by means of a frame 16 secured to the housing by means of suitable bolts 18 and a gasket 20 is preferably disposed between the housing and the frame. The housing 10 and the plate 14 thus form a chamber 22 adapted to contain the liquid to be observed through the glass plate. A piece of wire 24 is secured to the upper and lower ends of the housing 10 in position such as to be slightly to the rear of the back surface of the plate 14 when the latter is in position. The wire 24 serves as a guide for a slidable brush or scraper 26, the scraper being provided with an opening 28 through which the wire 24 passes and positioned so that the scraper can be moved longitudinally of the chamber 22 while remaining in contact with the back or inner surface of the glass plate 14. The scraper 28 may be provided with sharpened edges 30 where it contacts the glass plate so that it can more readily remove any deposits which may adhere to the plate.

The scraper 26 is partly or wholly formed of iron or some other magnetic material and can thus be moved along the surface of the plate 14 by means of a magnet 32. The magnet upon being placed close to or against the front surface of the glass plate 14 will attract the scraper 26 and when the magnet is moved up and down along the plate 14 the scraper will follow and in so doing will clean the inner or rear surface of the plate. Although the magnet 32 is illustrated as being of the permanent type, an electro-magnet can also be used, the operation being the same as that already described.

In Figure 3 a double or two sided gauge is shown, this gauge being provided with two oppositely disposed glass plates 34 secured to a housing member 36 by means of frames 38. In this case a pair of scraper members 40 are used, these members being slidably mounted on guide wires 42 in the same manner as was described with reference to the form shown in Figure 1. A pair of magnets 44 may be used, or in case the magnets are not supported by any carrying means, one magnet would be sufficient since it can be used first on one side of the gauge and then on the other to move the respective scraper members 40.

Although the invention has been described as applied to flat plate liquid level gauges of the Jerguson type, it will be understood that almost any type of gauge can be cleaned in the same manner. For instance, a gauge formed of a single glass tube can have disposed therein a scraper or wiper member of a shape adapted to fit the inner surface of the tube and when the scraper is moved longitudinally of the gauge the inner surface will be cleaned in the manner described hereinbefore. Likewise, it is intended that the invention be not limited to use with liquid level gauges since many other types of gauges or instruments having an observation or window plate of glass or other transparent material may be cleaned in this same manner, i. e., by moving a scraper or wiper member of a size and shape to fit the inner surface of the window by means of a magnet manipulated outside of the window.

Obviously many modifications and variations of the invention may be made without departing from the spirit and scope thereof, and therefore only such limitations should be imposed as are indicated by the appended claims.

I claim:

1. In a measuring instrument, a housing, a transparent window secured to one side of said housing, said housing and window forming an elongated chamber adapted to contain a substance to be observed, means for cleaning the inner surface of said window comprising a scraper containing magnetic material disposed within said chamber and capable of longitudinal movement therethrough, a magnet adapted to be moved along the outer surface of said window so as to cause said scraper to move in a corresponding manner along and in contact with the inner surface of the window and means for holding said scraper in position against the inner surface of the window when said scraper is not being moved by said magnet, said last named means comprising a wire secured at its opposite ends to said housing at the rear of said window, said scraper being adapted to slide on said wire.

2. In a gauge glass, a housing, a glass window secured to one side of said housing, said housing and glass window forming a chamber adapted to contain a liquid the level of which is to be measured, means for cleaning the inner surface of said window comprising a cleaning member containing magnetic material disposed within said chamber, means for guiding said cleaning member so that it may have sliding movement longitudinally of the chamber and in contact with the inner surface of said glass window, and a magnet adapted to be raised and lowered along the outer surface of said window so as to cause said cleaning member to move along said guide means and in contact with the inner surface of the glass window to remove any deposits therefrom.

WALDERSEE B. HENDREY.